United States Patent [19]
Trikha

[11] Patent Number: 6,003,811
[45] Date of Patent: *Dec. 21, 1999

[54] AIRCRAFT SERVOVALVE CURRENT RATE LIMITER

[75] Inventor: Arun K. Trikha, Bellevue, Wash.

[73] Assignee: The Boeing Company, Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,840

[22] Filed: Mar. 24, 1997

[51] Int. Cl.$^6$ ........................... B64C 13/36
[52] U.S. Cl. .................... 244/78; 244/195; 91/361
[58] Field of Search .................... 244/193, 194, 244/195, 227; 91/361–362, 364, 365, 106, 140, 363 A

[56] References Cited

U.S. PATENT DOCUMENTS

| | | |
|---|---|---|
| 2,633,830 | 4/1953 | McCourty et al. . |
| 2,658,483 | 10/1953 | Harris . |
| 3,110,321 | 11/1963 | Broad . |
| 3,995,800 | 12/1976 | Swooger ................................. 244/78 |
| 4,398,242 | 8/1983 | Buus . |
| 4,595,979 | 6/1986 | Arai et al. ............................. 244/78 |
| 4,807,516 | 2/1989 | Takats . |
| 4,817,498 | 4/1989 | Takagi ................................. 91/361 |
| 5,012,722 | 5/1991 | McCormick ......................... 91/361 |
| 5,214,913 | 6/1993 | Tani et al. . |
| 5,224,664 | 7/1993 | Adams, Sr. et al . |
| 5,351,914 | 10/1994 | Nagao et al. ........................ 244/78 |
| 5,409,188 | 4/1995 | Takagi et al. ....................... 244/78 |

*Primary Examiner*—Galen L. Barefoot
*Attorney, Agent, or Firm*—James P. Hamley

[57] ABSTRACT

Aircraft flight path changes commanded by a pilot via the wheel, column and pedal (12) are converted to position sensor signals (14) and passed as the input to primary flight computer (26). The primary flight computer (26) converts these pilot inputs and the inputs from autopilot (25) into desired surface actuator commands and then transmits them to actuator control electronics (18). The actuator control electronics (18) also receives a position feedback signal, representative of the position of the aircraft control surface (42). The actuator control electronics (18) produces a control signal which is fed to the input of an actuator (32) which includes a hydraulic system (34). The actuator responds to control input signals to drive linkage (40) which then positions the control surface (42). A rate limiter (110) imposes maximum rate limits to the actuator input signal (30) to thereby reduce peak transient hydraulic fluid pressure in the hydraulic system (34) and corresponding return and pressure lines (36), (38) to specified maximum values.

4 Claims, 3 Drawing Sheets

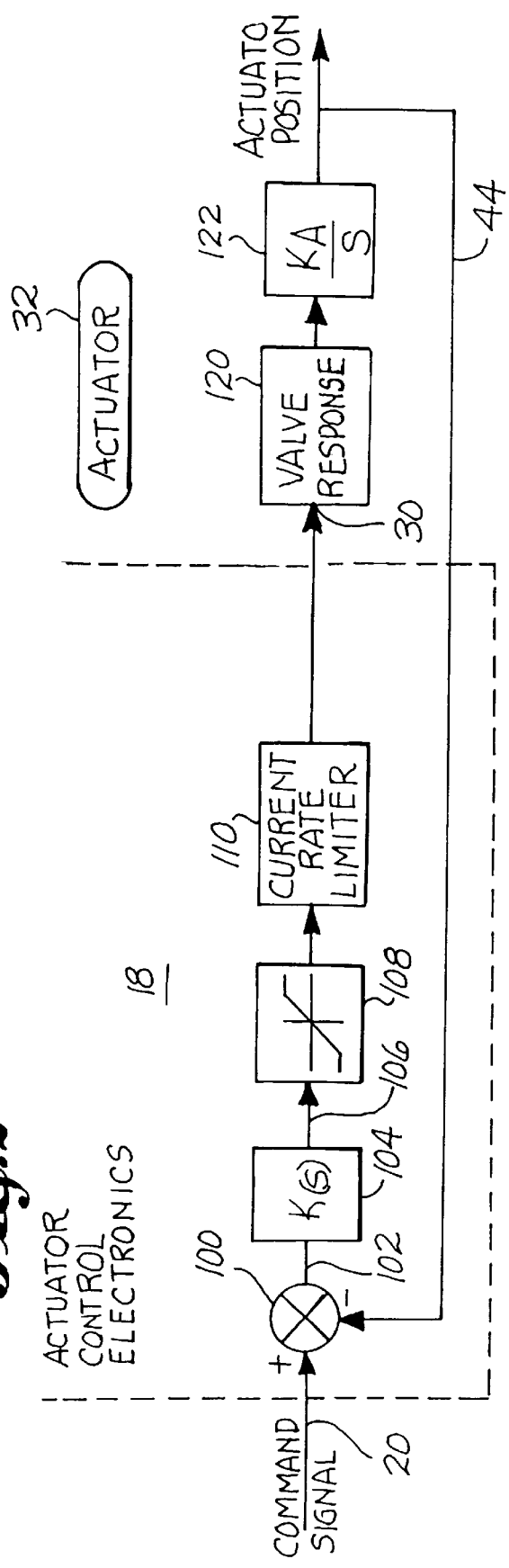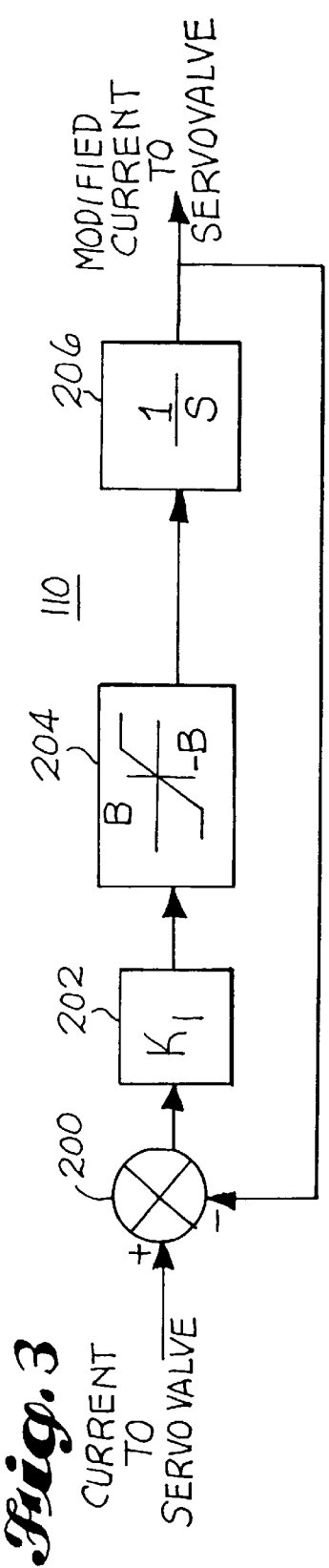

AIRCRAFT SERVOVALVE CURRENT RATE LIMITER

BACKGROUND OF THE INVENTION

The present invention relates to the electro-hydraulic servovalve art and, more particularly, to a rate limiter which limits the rate of change of the control signal applied to an aircraft electro-hydraulic servovalve to limit peak hydraulic pressure to a specified maximum value.

Electro-hydraulic servovalve systems are found in many applications, including the aircraft control art. There, aircraft control surfaces, such as the elevators and rudder(s) are driven into position by hydraulic actuators, each of which is under the control of an electrical command signal. This command signal is produced as a result of the pilot's or the autopilot's inputs representative of a desired change in the aircraft's flight path.

A problem that is common to such electro-hydraulic servo control systems, especially in aircraft applications, is that the hydraulic peak pressures under transient conditions, both on the pressure and return sides, may exceed acceptable limits. In addition, the magnitudes of the transient pressure variations may significantly reduce fatigue life of the hydraulic tubing and other components. Since the hydraulic system, including the various hydraulic lines must be capable of handling such transient pressure peaks and variations without failure, it is desirable to minimize the transient pressures to thereby reduce the peak pressure handling and fatigue life requirements on the hydraulic system.

One approach to reducing hydraulic transient peaks is through the use of an accumulator. An accumulator is a mechanical tank which connects to the pressure (and/or return) side of the hydraulic system. A reservoir of hydraulic fluid within the tank acts on a piston-like device having hydraulic fluid on one side and a compressed gas on the other. As a transient pressure peak occurs in the line, the piston displaces against the pressure of the compressed gas, thereby limiting the maximum value of the transient peak hydraulic pressure.

While hydraulic system accumulators do act to reduce transient pressure peaks, they add significant weight, cost and maintenance requirements to an aircraft.

Another possible approach is to reduce the pressure transients is to increase the hydraulic line diameters. However, this approach imposes even higher weight penalty than the use of accumulators.

It should be noted that there are two other ways of reducing or controlling the maximum servovalve rates without using the servovalve current rate limiter, but these methods also have serious deficiencies.

In the first alternate method, system gain can be reduced to slow down the servovalve and thus indirectly reduce the maximum servovalve rate. However, this also results in unacceptable degradation of the actuator dynamic response characteristics.

In the second alternate method, a servovalve with the servo controlled system can be mechanically modified to have a reduced rate capability. However, the desired rate capability can be achieved only at a specific hydraulic system supply pressure and temperature. In practice, the hydraulic system supply pressure and temperature can vary significantly over various flight conditions. The mechanically achieved servovalve rate limiting capability will then often be either too high to adequately control the pressure peaks or too low to achieve the desired actuator dynamic response characteristics.

There is a need in the art, therefore, for an apparatus and method which inherently reduces pressure transients created in hydraulic systems, such as are found on aircraft, which does not rely on the use of an accumulator or other additional hydraulic device and which does not result in unacceptable degradation of the actuator dynamic response characteristics.

SUMMARY OF THE INVENTION

It is an object of this invention, therefore, to provide both a method and apparatus to reduce transient pressure peaks in electro-hydraulic servovalve systems without the use of accumulators or other mechanical structures which add to the cost, weight and maintainability of the system.

It is a further object of the invention to provide the method and apparatus for reducing transient peaks in electro-hydraulic servovalve systems in a manner that does not compromise system dynamic response.

Briefly, according to the invention, an aircraft flight control system includes an input command system for producing a command signal representative of a desired flight path change to the aircraft. An aircraft control surface is provided and is controllably moveable to change the flight path of the aircraft. An electro-hydraulic servovalve system has an input adapted to receive a control signal, a hydraulic system responsive to the received control signal to distribute a pressurized hydraulic fluid and control a moveable output which is linked to the aircraft control surface to control movement thereof. A signal processor receives the command signal and predeterminedly produces the control signal for application to the input of the electro-hydraulic servovalve system. The signal processor includes a rate limiter for imposing a predetermined rate limit on the control signal such that transient pressure peaks within the hydraulic system are maintained below a predetermined maximum limit.

A method for implementing an aircraft flight control system includes the first step of receiving an input command signal representative of a desired flight path change of the aircraft. The method includes providing an aircraft control surface which is controllably moveable to change the flight path of the aircraft. A provided electro-hydraulic servovalve system has an input adapted to receive a control signal, a hydraulic system responsive to the received control signal to distribute a pressurized hydraulic fluid and control a moveable output which is linked to the aircraft control surface to control movement thereof. The final step includes processing the received input command signal and predeterminedly producing the control signal for application to the input of the electro-hydraulic servovalve system. The processing step includes the step of rate limiting the control signal such that transient pressure peaks within the hydraulic system are maintained below a predetermined maximum limit.

BRIEF DESCRIPTION OF THE DRAWINGS

FIG. 2 is a schematic diagram illustrating the signal processing system used in the electro-hydraulic servovalve system according to the invention which employs a current rate limiter;

FIG. 3 is a schematic diagram illustrating the preferred embodiment of the current rate limiter shown in FIG. 2.

DETAILED DESCRIPTION

Figure 1:
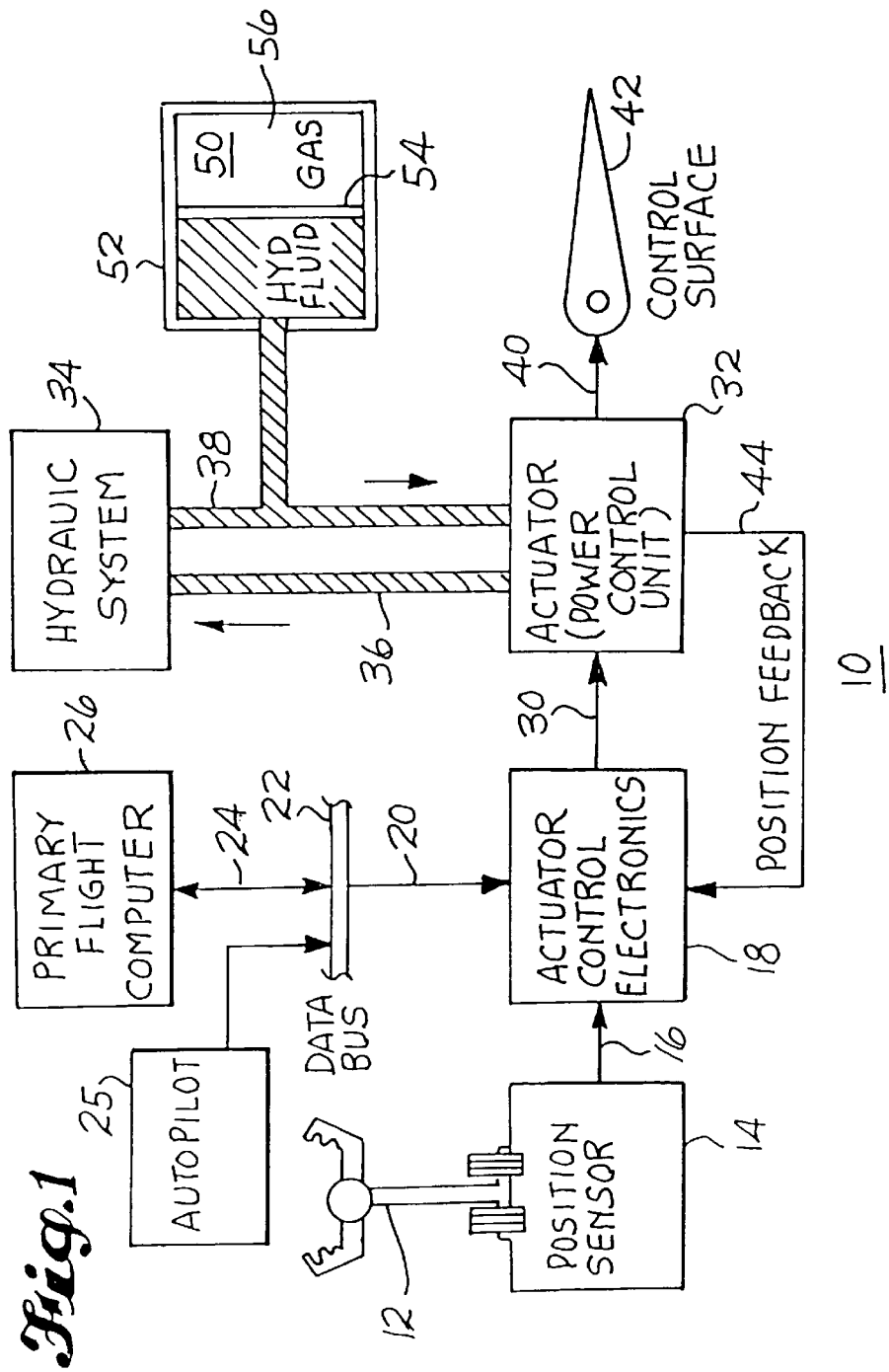
FIG. 1 is a block diagram illustrating the principal components in a fly-by-wire aircraft primary flight control system which includes an electro-hydraulic servovalve control system.

Referring to FIG. 1, shown in block diagram form is a fly-by-wire aircraft primary flight control system, indicated generally at 10. The system at its input responds to the pilot moving his wheel, column or pedal 12 to indicate a desired change in the aircraft's flight path. Position sensors 14 convert the pilot's wheel, column or pedal movements into corresponding command signals which are output over a line 16. The command signals pass from line 16 to actuator control electronics 18. The actuator control electronics 18 communicate through data transfer unit 20 to a provided data bus 22. Signals on the data bus 22 are in turn provided through data transfer unit 24 to the primary flight computer 26. Alternatively, the primary flight computer 26 receives flight path change commands from the autopilot 25 through data bus 22 and data transfer unit 24. The primary flight computer 26 converts the autopilot inputs as well as the pilot column, wheel, and pedal inputs into desired surface actuator commands in accordance with the flight control characteristics of a particular airplane and transmits them back to the actuator control electronics through data transfer units 20, 24 and data bus 22. The actuator control electronics then controls the actuators to achieve the commanded actuator positions.

The actuator control electronics 18 responds to an input command signal over line 16, and any inputs from the primary flight computer 26 to produce a control signal on its output line 30. This control signal is passed to an actuator 32 which is often referred to as a power control unit. The actuator 32 connects to a hydraulic system 34 through a return hydraulic line 36 and an input, or pressure hydraulic line 38. In response to a control signal over line 30, the actuator redistributes hydraulic fluid under pressure to produce an output movement which, via linkage 40, rotates an aircraft control surface 42 into a desired position. The actual position of the control surface 42 is provided as a feedback signal from the actuator 32 over a position feedback line 44 to the actuator control electronics 18. In this way, the actuator control electronics 18 can compare the commanded actuator position as dictated by the primary flight computer 26 to the actual position of the control surface 42 and thereby apply an error correction signal, if necessary, over line 30 to the actuator to reposition the control surface 42.

A significant consideration in electro-hydraulic servo systems as depicted in FIG. 1 is the peak levels of hydraulic fluid pressures appearing both in the return line 36 and the pressure line 38. The sudden acceleration and deceleration of hydraulic fluid during actuator motion can result in high transient hydraulic fluid pressure levels. It is important that the components of the hydraulic system, including the lines 36 and 38, be designed to handle these pressure transients, including the peak values. It is desirable to limit the peak values to some maximum specified limit, to thereby reduce the loading suffered by the hydraulic lines 36, 38.

One way known to the prior art to reduce transient peak hydraulic pressure levels is through addition of a mechanical accumulator, indicated generally at 50. The accumulator 50 attaches to the pressure line 38 from the hydraulic system. A reservoir 52 of hydraulic fluid in the accumulator 50 acts on one side of a piston 54. Acting on the opposite side of piston 54 is a trapped compressed gas 56.

Now, as pressure peaks in the line 38 occur, the accumulator's piston 54 can displace against the gas 56 and thereby limit the peak value of the transient peak pressure levels. However, the use of accumulators adds significant weight, cost and maintenance requirements such that an alternate means of reducing hydraulic pressure is desired.

FIG. 2 is a schematic diagram illustrating the preferred embodiment of the present invention which utilizes an innovative current rate limiter to reduce hydraulic fluid pressure maximum peak values. Here, the input command signal is carried over a line 20 to the input of the actuator control electronics, indicated generally at 18. Within the actuator control electronics is a summing circuit 100 which sums the input command signal over line 16 with the position feedback signal over line 44, here shown in the negative sense, to produce an actuator position error signal carried over line 102. The actuator position error signal is then amplified by a gain and compensation factor K(s) in a gain block 104. The output from gain block 104 is a driving current which is used to drive a current input of the electro-hydraulic servovalve system. This driving current is carried over line 106 to a current limiter block 108. Current limiter block 108 has a linear transfer characteristic between the maximum and minimum current limits designed into the system in accordance with standard practice.

The current limited current command signal out of current limiter 108 is applied to an innovative current rate limiter 110. The current rate limiter 110, in a manner shown in greater detail with respect to FIG. 3, limits the rate at which changes in the subsequent hydraulic system can occur. By limiting the rate of change of current, a corresponding reduction in maximum hydraulic pressure can be realized.

The output for the current rate limiter 110 is passed over a line 30 to the input of the actuator, here shown generally at 32. The actuator includes the electro-hydraulic valve, whose response is indicated at block 120. The output from the valve response block 120, which is valve position, is then modified by a gain factor $K_A$ and an integration in the electro-hydraulic conversion block 122. The output from electro-hydraulic conversion block 122 represents the actuator position, which is then carried over line 44 to the actuator control electronics (18 of FIG. 1) as a position feedback signal. (Integration in FIG. 2, blocks 122 and 206 are indicated by their Laplace transform 1/s).

FIG. 3 is a schematic diagram illustrating the preferred embodiment of the electro-hydraulic current rate limiter 110 as shown in FIG. 2. Here, current from the current limiter (108 of FIG. 2) is passed to a summing circuit 200. The output from the summing circuit 200 is passed through a gain block 202 which amplifies the input signal by a predetermined gain factor $K_1$, The output from gain block 202 is applied to the input of a current rate block 204. Current rate block 204 has a linear transfer for control currents which are less than a maximum value B but greater than a negative limit (−B). Should the input current attempt to exceed the maximum B, or minimum value −B, it is limited to the +B, −B values. The output from the current rate block 204 is passed to an integrating block 206. The output from integrating block 206 is taken as the negative input to the summing circuit 200.

Thus, the current rate limiter 110 of FIG. 3 operates as a current rate limiter to limit the rate of change of control current to the electro-hydraulic servovalve to maximum rate limits.

The servovalve current rate limit is defined on the basis of the desired value of the maximum servovalve rate, which in turn may be estimated from the equation:

$$K = q_0 \cdot (2\, p \cdot c \cdot \Delta t/A) \cdot (1.+1.596\, t_0^{0.5}) \qquad 5$$

$q_0$=valve flow per unit valve displacement, in²/sec
$\rho$=fluid density, $lb_f$-sec²/in⁴

$\Delta t$ = time for the pressure wave to travel distance $L$ from actuator to the upstream section with higher flow area
= $L/c$ c=wave speed in fluid=$(\beta/\rho)^{0.5}$
$\beta$=adiabatic bulk modulus, psi
$t_0 = v \cdot \Delta t / r^2$
v=kinematic viscosity of fluid, in²/sec
r=internal line radius, in In one particular application of the current rate limiter shown in FIG. 3, it was desired that the maximum change in pressure of the hydraulic system not exceed 3,500 psi. Using the above equation, it was determined that the maximum servovalve rate was 0.7 inches per second which corresponded to an electro-hydraulic servovalve input signal whose rate of change did not exceed 140 mA/sec. Thus, with a value B in the current rate block 204 of 140 mA/sec, and a gain factor of $K_1$ in gain block 202 of 500, a system which realized the desired current rate limit and exhibited a time constant of only 2 ms was realized.

Figure 4:
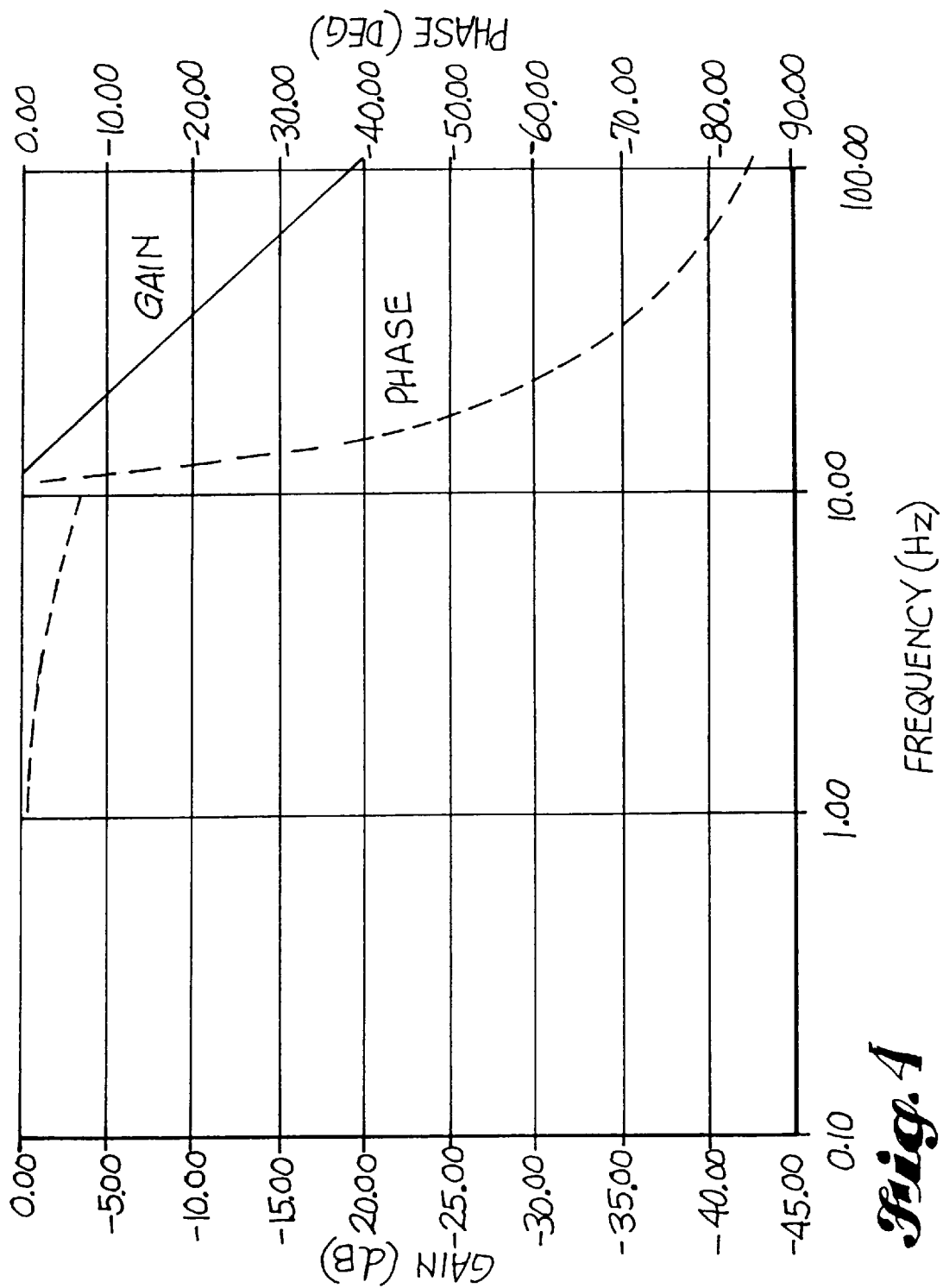
FIG. 4 is a gain/phase diagram illustrating the effect of the servovalve current rate limiter on the electro-hydraulic servovalve control system.

FIG. 4 is a gain/phase plot versus frequency showing the effect of the current rate limiter of FIG. 3 in the overall electro-hydraulic servovalve control system as shown in FIG. 2 for the particular implementation discussed above. Note that the gain of the system is unaffected at frequencies up to 10 Hz and the additional phase lag is less than 10° up to 10 Hz, which covers the usually desired frequency band for flight control actuators. Thus, the effects of the inventive servovalve current rate limiter on the actuator dynamic response characteristics are minimal, especially at low amplitude commands to the actuators. The effects of the servovalve current rate limiter on the actuator dynamic stiffness and the actuator force fight are also negligible. In addition, the inventive servovalve current rate limiter does not contribute to any system instability.

In summary, an improved method and apparatus for an electro-hydraulic servovalve control system has been described in detail. While a preferred embodiment of the invention has been described, it should be apparent that many modifications and variations thereto are possible, all of which fall within the true spirit and scope of the invention.

For example, whereas the preferred embodiment of the invention utilized analog circuitry to implement the control signal rate limiter, it is apparent that a digital implementation could be made without deviating from the scope of the present invention.

What is claimed is:

1. An aircraft flight control system comprising:
   a) an input command means for producing a command signal representative of a desired flight path change of the aircraft;
   b) an aircraft control surface being controllably moveable to change the flight path of the aircraft;
   c) an electro-hydraulic servovalve system having an input adapted to receive a control signal and a hydraulic system responsive to said received control signal to distribute a pressurized hydraulic fluid and control a moveable output which is linked to said aircraft control surface to control movement thereof; and
   d) signal processing means for receiving said command signal and predeterminedly producing said control signal for application to the input of said electro-hydraulic servovalve system, said signal processing means including a rate limiter for imposing a predetermined rate limit on said control signal to limit said electro-hydraulic servovalve velocity such that transient pressure peaks within said hydraulic system are maintained below a predetermined maximum limit.

2. In an electro-hydraulic servovalve control system which responds to a command input signal to predeterminedly position a mechanical device by means of the distribution of a pressurized hydraulic fluid in a hydraulic system, the improvement comprising:
   a rate limiter for imposing a predetermined rate limit on said command input signal to limit said electro-hydraulic servovalve velocity such that transient pressure peaks within said hydraulic system are maintained below a predetermined maximum limit.

3. A method for implementing an aircraft flight control system comprising the steps of:
   a) inputting a command signal representative of a desired flight path change of the aircraft;
   b) controllably moving the aircraft control surface to change the aircraft's flight path;
   c) providing an electro-hydraulic servovalve system having an input adapted to receive a control signal and a hydraulic system responsive to said received control signal to distribute a pressurized hydraulic fluid and control a moveable output which is linked to the aircraft control surface to control movement thereof; and
   d) processing the command signal and predeterminedly producing said control signal for application to the input of the electro-hydraulic servovalve system, said processing including rate limiting for imposing a predetermined rate limit on the control signal to limit said electro-hydraulic servovalve velocity such that transient pressure peaks within the hydraulic system are maintained below a predetermined maximum level.

4. In an electro-hydraulic servovalve control system which responds to a command input signal to predeterminedly position a mechanical device by means of the distribution of a pressurized hydraulic fluid in a hydraulic system, the method of limiting peak hydraulic pressure comprising the step of rate limiting the command input signal to a predetermined rate limit to limit said electro-hydraulic servovalve velocity such that transient pressure peaks within the hydraulic system are maintained below a predetermined maximum limit.

* * * * *